United States Patent
Jevans et al.

(10) Patent No.: US 8,745,365 B2
(45) Date of Patent: Jun. 3, 2014

(54) METHOD AND SYSTEM FOR SECURE BOOTING A COMPUTER BY BOOTING A FIRST OPERATING SYSTEM FROM A SECURE PERIPHERAL DEVICE AND LAUNCHING A SECOND OPERATING SYSTEM STORED A SECURE AREA IN THE SECURE PERIPHERAL DEVICE ON THE FIRST OPERATING SYSTEM

(75) Inventors: David Jevans, Menlo Park, CA (US); Gil Spencer, Los Gatos, CA (US); Eric R. Smith, Halifax, CA (US)

(73) Assignee: Imation Corp., Oakdale, MN (US)

( * ) Notice: Subject to any disclaimer, the term of this patent is extended or adjusted under 35 U.S.C. 154(b) by 384 days.

(21) Appl. No.: 12/537,194

(22) Filed: Aug. 6, 2009

(65) Prior Publication Data

US 2011/0035574 A1 Feb. 10, 2011

(51) Int. Cl.
*G06F 9/00* (2006.01)
*G06F 15/177* (2006.01)

(52) U.S. Cl.
USPC .......................................................... 713/2

(58) Field of Classification Search
USPC .......................................................... 713/2
See application file for complete search history.

(56) References Cited

U.S. PATENT DOCUMENTS

| | | | |
|---|---|---|---|
| 4,578,530 A | 3/1986 | Zeidler | |
| 5,010,571 A | 4/1991 | Katznelson | |
| 5,341,339 A | 8/1994 | Wells | |
| 5,404,485 A | 4/1995 | Ban | |
| 5,457,746 A | 10/1995 | Dolphin | |
| 5,479,638 A | 12/1995 | Assar et al. | |
| 5,857,021 A | 1/1999 | Kataoke et al. | |
| 5,937,425 A | 8/1999 | Ban | |
| 6,032,227 A | 2/2000 | Shaheen et al. | |
| 6,081,875 A | 6/2000 | Clifton et al. | |
| 6,092,196 A | 7/2000 | Reiche | |
| 6,094,721 A | 7/2000 | Eldridge et al. | |
| 6,118,874 A | 9/2000 | Okamoto et al. | |
| 6,223,284 B1 | 4/2001 | Novoa | |
| 6,292,899 B1 | 9/2001 | McBride | |
| 6,539,480 B1 | 3/2003 | Drews | |
| 6,731,536 B1 | 5/2004 | McClain | |
| 6,763,468 B2 | 7/2004 | Gupta et al. | |
| 6,776,332 B2 | 8/2004 | Allen et al. | |
| 6,791,877 B2 | 9/2004 | Miura et al. | |
| 6,834,795 B1 | 12/2004 | Rasmussen et al. | |

(Continued)

FOREIGN PATENT DOCUMENTS

| | | |
|---|---|---|
| KR | 2005-078027 | 8/2005 |
| WO | WO 02/47081 A2 | 6/2002 |

OTHER PUBLICATIONS

Stallings. "Cryptography and Network Security," 2003, Prentice Hall, pp. 258-265, 318-320, and 385.
Lam, "Freshness Assurance of Authentication Protocols," 1992, Proceedings ESORICS '92, pp. 1-13.
Kim, Jesung et al. "A Space-Efficient Flash Translation Layer for compact Flash Systems," *IEEE Transactions on Consumer Electronics*, vol. 48, No. 2, May 2002.

(Continued)

*Primary Examiner* — Thomas Lee
*Assistant Examiner* — Xuxing Chen
(74) *Attorney, Agent, or Firm* — Dorsey & Whitney, LLP (57) ABSTRACT

An operating system is booted from a secure peripheral device on a host computer. The secure peripheral device, which includes a memory, is communicatively coupled with the with the host computer. A first operating system is booted from the memory of the secure peripheral device. A secondary operating system is launched on the first operating system.

38 Claims, 6 Drawing Sheets

(56) References Cited

U.S. PATENT DOCUMENTS

| | | | |
|---|---|---|---|
| 6,901,493 B1 | 5/2005 | Maffezzoni | |
| 6,920,527 B2 | 7/2005 | Cloutier et al. | |
| 6,961,852 B2 | 11/2005 | Craft | |
| 6,987,927 B1 | 1/2006 | Battaglia et al. | |
| 6,993,661 B1 | 1/2006 | Garfinkel | |
| 7,224,209 B2 | 5/2007 | Hsu | |
| 7,266,699 B2 | 9/2007 | Newman et al. | |
| 7,272,723 B1 | 9/2007 | Abbott et al. | |
| 7,275,139 B1 | 9/2007 | Tormasov et al. | |
| 7,278,025 B2 | 10/2007 | Saito et al. | |
| 7,305,387 B2 | 12/2007 | Poyourow | |
| 7,330,977 B2 | 2/2008 | Cromer et al. | |
| 7,360,091 B2 | 4/2008 | Aikawa et al. | |
| 7,370,166 B1* | 5/2008 | Ramesh et al. | 711/163 |
| 7,412,420 B2 | 8/2008 | Holdsworth | |
| 7,461,218 B2 | 12/2008 | Muthrasanallur et al. | |
| 7,475,425 B2 | 1/2009 | Bantz et al. | |
| 7,478,248 B2* | 1/2009 | Ziv et al. | 713/193 |
| 7,496,714 B2 | 2/2009 | Gill et al. | |
| 7,496,765 B2 | 2/2009 | Sengoku | |
| 7,620,761 B2 | 11/2009 | Chou et al. | |
| 7,624,233 B2 | 11/2009 | Kavian | |
| 7,631,158 B2 | 12/2009 | Chen | |
| 7,631,191 B2 | 12/2009 | Glazer et al. | |
| 7,685,425 B1 | 3/2010 | Wright et al. | |
| 7,698,442 B1 | 4/2010 | Krishnamurthy et al. | |
| 7,698,480 B2 | 4/2010 | Bychkov et al. | |
| 7,757,088 B2 | 7/2010 | Abdulhayoglu | |
| 7,809,908 B2 | 10/2010 | Chen | |
| 7,831,045 B2 | 11/2010 | Junod | |
| 7,926,054 B2* | 4/2011 | Sonderegger et al. | 718/1 |
| 8,015,606 B1 | 9/2011 | Jevans et al. | |
| 2001/0045451 A1 | 11/2001 | Tan et al. | |
| 2002/0029215 A1 | 3/2002 | Whitmyer, Jr. | |
| 2002/0044663 A1 | 4/2002 | King et al. | |
| 2002/0046342 A1 | 4/2002 | Elteto et al. | |
| 2003/0005336 A1 | 1/2003 | Poo et al. | |
| 2003/0041253 A1 | 2/2003 | Matsui et al. | |
| 2003/0149670 A1 | 8/2003 | Cronce | |
| 2003/0149854 A1 | 8/2003 | Yoshino et al. | |
| 2003/0154337 A1* | 8/2003 | Ohno et al. | 710/260 |
| 2003/0159053 A1 | 8/2003 | Fauble et al. | |
| 2003/0182584 A1 | 9/2003 | Banes | |
| 2003/0204735 A1 | 10/2003 | Schnitzmeier | |
| 2003/0204754 A1 | 10/2003 | Cromer et al. | |
| 2003/0215090 A1 | 11/2003 | Saito et al. | |
| 2004/0059925 A1 | 3/2004 | Benhammou et al. | |
| 2004/0073797 A1 | 4/2004 | Fascenda | |
| 2004/0103288 A1 | 5/2004 | Ziv et al. | |
| 2004/0103325 A1 | 5/2004 | Priebatsch | |
| 2004/0123113 A1 | 6/2004 | Mathiassen et al. | |
| 2004/0135241 A1 | 7/2004 | Conner et al. | |
| 2004/0146015 A1 | 7/2004 | Cross et al. | |
| 2004/0148453 A1 | 7/2004 | Manion et al. | |
| 2004/0177258 A1 | 9/2004 | Ong | |
| 2004/0188710 A1 | 9/2004 | Koren et al. | |
| 2005/0015540 A1 | 1/2005 | Tsai et al. | |
| 2005/0020315 A1 | 1/2005 | Robertson | |
| 2005/0044377 A1 | 2/2005 | Huang | |
| 2005/0055519 A1 | 3/2005 | Stuart et al. | |
| 2005/0182973 A1 | 8/2005 | Funahashi et al. | |
| 2005/0206353 A1 | 9/2005 | Sengoku | |
| 2006/0016875 A1 | 1/2006 | Bonalle et al. | |
| 2006/0021059 A1 | 1/2006 | Brown et al. | |
| 2006/0041932 A1 | 2/2006 | Cromer et al. | |
| 2006/0047717 A1 | 3/2006 | Pereira | |
| 2006/0069840 A1 | 3/2006 | Corbett et al. | |
| 2006/0095688 A1 | 5/2006 | Kawamura et al. | |
| 2006/0117393 A1 | 6/2006 | Merry et al. | |
| 2006/0129830 A1 | 6/2006 | Haller et al. | |
| 2006/0143476 A1 | 6/2006 | McGovern | |
| 2006/0149915 A1 | 7/2006 | Maly | |
| 2006/0156036 A1 | 7/2006 | Oh et al. | |
| 2006/0179309 A1 | 8/2006 | Cross et al. | |
| 2006/0184806 A1* | 8/2006 | Luttmann et al. | 713/193 |
| 2006/0208066 A1 | 9/2006 | Finn et al. | |
| 2006/0224742 A1 | 10/2006 | Shahbazi | |
| 2006/0224846 A1 | 10/2006 | Amarendran et al. | |
| 2006/0236363 A1 | 10/2006 | Heard et al. | |
| 2007/0005913 A1 | 1/2007 | Muthrasanallur et al. | |
| 2007/0016743 A1 | 1/2007 | Jevans | |
| 2007/0016756 A1 | 1/2007 | Hsieh et al. | |
| 2007/0028033 A1 | 2/2007 | Hsieh et al. | |
| 2007/0033330 A1 | 2/2007 | Sinclair et al. | |
| 2007/0038802 A1 | 2/2007 | Tsai et al. | |
| 2007/0056043 A1 | 3/2007 | Onyon et al. | |
| 2007/0067620 A1 | 3/2007 | Jevans | |
| 2007/0083939 A1 | 4/2007 | Fruhauf et al. | |
| 2007/0101434 A1 | 5/2007 | Jevans | |
| 2007/0113228 A1* | 5/2007 | Raghunath et al. | 718/1 |
| 2007/0118898 A1 | 5/2007 | Morgan et al. | |
| 2007/0143530 A1 | 6/2007 | Rudelic et al. | |
| 2007/0143532 A1 | 6/2007 | Gorobets et al. | |
| 2007/0156985 A1 | 7/2007 | Tsai et al. | |
| 2007/0160198 A1 | 7/2007 | Orsini et al. | |
| 2007/0180509 A1 | 8/2007 | Swartz et al. | |
| 2007/0181698 A1 | 8/2007 | Wilson | |
| 2007/0192610 A1* | 8/2007 | Chun et al. | 713/176 |
| 2007/0250919 A1 | 10/2007 | Shull et al. | |
| 2007/0266421 A1 | 11/2007 | Vaidya et al. | |
| 2007/0300031 A1 | 12/2007 | Jevans et al. | |
| 2007/0300052 A1 | 12/2007 | Jevans | |
| 2008/0005561 A1 | 1/2008 | Brown et al. | |
| 2008/0040613 A1 | 2/2008 | Challener | |
| 2008/0046990 A1* | 2/2008 | Narayanaswami et al. | 726/9 |
| 2008/0082813 A1* | 4/2008 | Chow et al. | 713/2 |
| 2008/0192928 A1 | 8/2008 | Yu et al. | |
| 2008/0209132 A1 | 8/2008 | Chen | |
| 2008/0229023 A1 | 9/2008 | Plamondon | |
| 2008/0229024 A1 | 9/2008 | Plamondon | |
| 2008/0229025 A1 | 9/2008 | Plamondon | |
| 2008/0256536 A1* | 10/2008 | Zhao et al. | 718/1 |
| 2008/0270724 A1 | 10/2008 | Ramesh et al. | |
| 2008/0288766 A1* | 11/2008 | Inoue et al. | 713/2 |
| 2009/0132752 A1 | 5/2009 | Poo et al. | |
| 2009/0222117 A1 | 9/2009 | Kaplan et al. | |
| 2009/0276534 A1 | 11/2009 | Jevans | |
| 2009/0276623 A1 | 11/2009 | Jevans | |
| 2009/0300710 A1 | 12/2009 | Chai et al. | |
| 2009/0307451 A1 | 12/2009 | Abzarian et al. | |
| 2010/0017566 A1 | 1/2010 | Danilak | |
| 2010/0228906 A1 | 9/2010 | Mothilal et al. | |
| 2010/0250796 A1 | 9/2010 | Jevans | |
| 2011/0035513 A1 | 2/2011 | Jevans | |

OTHER PUBLICATIONS

Denning, Dorothy E. et al. "A Taxonomy for Key Escrow Encryption Systems," *Communications of the ACM*, vol. 39, No. 3, pp. 34-40 (Mar. 1996).

Tal, Arie. "Two Technologies Compared: NOR v. NAND", White Paper, 01-SR-012-04-8L, Rev. 1.1, Jul. 2003, pp. 1-14.

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

Sedaghat et al. "A Dynamic Web Agent for Verifying the Security and Integrity of a Web Site's Contents," IEEE, Aug. 2002.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random Number Generator Embedded in Reconfigurable Hardware." Springer-Verlag. Lecture Notes in Computer Science. vol. 2523, pp. 415-430. 2003.

Araujo, Andre R. et al. "Hybrid Cloud Integration and Monitoring with IBM WebSphere Cast Iron," International Business Machines Corporation, Dec. 2012.

* cited by examiner

METHOD AND SYSTEM FOR SECURE BOOTING A COMPUTER BY BOOTING A FIRST OPERATING SYSTEM FROM A SECURE PERIPHERAL DEVICE AND LAUNCHING A SECOND OPERATING SYSTEM STORED A SECURE AREA IN THE SECURE PERIPHERAL DEVICE ON THE FIRST OPERATING SYSTEM

CROSS-REFERENCES TO RELATED APPLICATIONS

The present application is related to U.S. Provisional Patent Application No. 61/126,473 filed May 2, 2008 and entitled "Enterprise Device Recovery," U.S. patent application Ser. No. 12/434,628 filed May 2, 2009 and entitled "Enterprise Device Recovery," U.S. patent application Ser. No. 12/412,844 filed Mar. 27, 2009 and entitled "Establishing a Secure Channel Between a Server and a Portable Storage Device," and U.S. patent application Ser. No. 12/537,172, filed Aug. 6, 2009, and entitled "Peripheral Device Data Integrity," the disclosures of which are incorporated herein by reference.

BACKGROUND OF THE INVENTION

1. Field of the Invention

The present invention relates generally to data storage devices. More specifically, the present invention relates to running a computer from a secure portable device.

2. Related Art

Modern computers provide for the ability to boot from a Universal Serial Bus (USB) flash drive. There are several advantages to running an operating system (OS) on a USB flash drive. First, USB flash drives typically utilize substantially less energy than hard drives. Hard drives have large platters that spin constantly, using up power. Second, USB flash drives are silent. Hard drives, especially older ones, can be noisy. Third, USB flash drives can be read from in a random fashion. Your system might actually run faster on a flash drive if it spends most of its time getting small bits of data from different parts of the drive. Fourth, USB flash drives provide for portability. A user can transport a USB flash drive to a different computer, reboot, and resume where the user left off.

Virtual Machines (VMs) allow the sharing of underlying physical machine resources between different VMs, each running its own operating system (OS). Multiple OS environments can co-exist on the same computer, in strong isolation from each other. The VM can provide an instruction set architecture (ISA) that is somewhat different from that of the real machine.

The desire to run multiple OSes was the original motivation for VMs, as it allowed time-sharing of a single computer between several single-tasking OSes. This technique requires a process to share the CPU resources between guest operating systems and memory virtualization to share the memory on the host.

All of the guest OSes do not have to be the same, making it possible to run different OSes on the same computer (e.g., Microsoft Windows and Linux, or older versions of an OS in order to support software that has not yet been ported to the latest version). The use of VMs to support different guest OSes is becoming popular in embedded systems; a typical use is to support a real-time OS at the same time as a high-level OS such as Linux or Windows, for example.

One use of VMs is emulation of the underlying raw hardware (native execution). Each VM can run any operating system supported by the underlying hardware. Users can thus run two or more different "guest" OSes simultaneously, in separate "private" virtual computers.

Another use of VMs is emulation of a non-native system. VMs can perform the role of an emulator, allowing software applications and OSes written for another computer processor architecture to be run.

Presently, various kinds of data can be stored on a peripheral device, such as a USB flash drive, for example. These devices are very lightweight and portable. However, one drawback is that the devices are typically not secure. If lost or stolen, confidential data can be compromised. Consequently, there is a need in the art for an improved system and method for booting a guest or secondary operating system from a peripheral device on a host computer.

SUMMARY OF THE INVENTION

Embodiments of the present invention allow for running a computer from a secure portable device.

In a first claimed embodiment, a method is disclosed for booting an operating system from a secure peripheral device on a host computer. The peripheral device, which includes a memory, is communicatively coupled the with the host computer. A first operating system is booted from the memory of the peripheral device. A secondary operating system is launched on the first operating system.

In a second claimed embodiment, a system is set forth for booting an operating system from a secure peripheral device on a host computer. The system includes a secure peripheral device comprising a memory; a host computer configured to run a first operating system, the host computer communicatively coupled with the peripheral device; a first operating system stored in the memory of the secure peripheral device and executable by a processor to launch a computer-program; and a secondary operating system stored in the memory of the secure peripheral device and executable by a processor.

A third claimed embodiment includes a computer readable storage medium having a program embodied thereon. The program is executable by a processor to perform a method for booting an operating system from a secure peripheral device on a host computer. The peripheral device, which includes a memory, is communicatively coupled the with the host computer. A first operating system is booted from the memory of the peripheral device. A secondary operating system is launched on the first operating system.

DETAILED DESCRIPTION OF EXEMPLARY EMBODIMENTS

As mentioned herein, data can be stored on a peripheral device, such as data storage device or a secure data storage device (an external hard drive or a Universal Serial Bus (USB) flash drive, for example). These devices are very lightweight and portable. There is a need in the art to allow a secure peripheral device to be used to facilitate the booting of a secondary or guest OS (e.g. a VM) on a host computer running a host OS. In exemplary embodiments, a user can carry a portable storage device that stores a host OS (first OS) and a guest OS, plug the device into a desired host computer, and portably boot onto the host computer a desired OS with their applications and data in a VM. This eliminates the need to carry a laptop around. As such, embodiments according to the present invention address the need for booting a guest OS from a secure peripheral device on a host computer.

In one embodiment, the peripheral device emulates a CD-ROM to the host computer. The CD-ROM emulated image is configured to appear as a bootable CD-ROM complete with master boot records. This makes it easy for a user to boot from the device, as one does not have to configure their host BIOS to boot from a USB flash drive. Instead, the user uses the host computer's existing configuration to boot from a bootable CD-ROM. Thus, the CD-ROM image presented to the host computer is configured to be bootable by the host computer.

Figure 1:
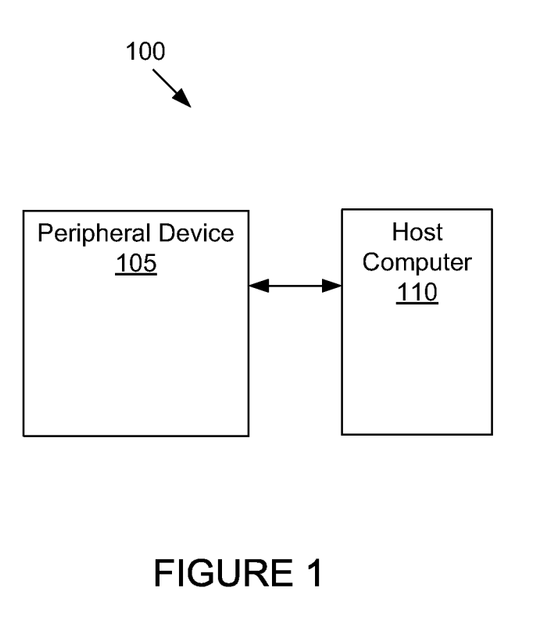
FIG. 1 is a block diagram of an exemplary environment for practicing embodiments of the present invention.

Referring now to FIG. 1, a block diagram of an exemplary environment 100 is presented. As depicted, the environment 100 includes a peripheral device 105 and a host computer 110. The peripheral device 105 is communicatively coupled with the host computer 110. It is noteworthy that communicative couplings may be wireless or wired. In some exemplary embodiments, the communicative coupling is done over a secure channel, or secure communication path.

The peripheral device 105 includes a device secure channel engine. The host computer 110, in one embodiment, is communicatively coupled with a network and a server. The server includes a server secure channel engine.

The device secure channel engine includes a device cryptography module, a challenge generation module, a verification module, and a device storage module. Execution of the device cryptography module allows the controller 210 to encrypt and decrypt information stored by the memory 205 and transferred between the peripheral device 105 and the server, for example. In exemplary embodiments, the device cryptography module 305 implements one or more of a variety of cryptographic technologies. Examples of cryptographic technologies include symmetric algorithms such as Twofish, Serpent, AES (Rijndael), Blowfish, CAST5, RC4, TDES, and IDEA, as well as asymmetric algorithms that use one key to encrypt given information and another key to decrypt that information. Those skilled in the art will be familiar with symmetric and asymmetric approaches to cryptography. The device cryptography module may also be executable to concatenate information transferred between the peripheral device 105 and a server. Concatenation may be achieved through usage of message authentication code (MAC). Generally speaking, MAC describes a hashing mechanism with an associated secret that is used to identify a piece of data.

Execution of the challenge generation module allows the controller 210 to generate a server challenge. The server challenge may include a set of random numbers and be used to confirm an identity of the server. Furthermore, the server challenge is generated through execution of the challenge generation module on numerous occasions. For example, the server challenge may be generated each time a secure channel is established between the peripheral device 105 and the server.

Execution of the verification module allows the controller 210 to verify various information sent by the server to the peripheral device 105. In exemplary embodiments, the verification module is executable to verify signatures applied by the server to transferred information. The verification module may also be executable to verify that a server challenge received back from the server is consistent with a corresponding server challenge initially sent from the peripheral device 105 to the server. Additionally, it may be necessary to decrypt such a server challenge returned from the server. Decryption of the server challenge is achieved through execution of the device cryptography module.

The device storage module may be configured to manage information associated with formation of a secure channel between the peripheral device 105 and the server. This information may be stored on the controller 210 or the memory 205, and is accessed through execution of the device storage module. In exemplary embodiments, this information includes a device token. The device token may be created when the peripheral device 105 is fabricated or at a later time. The device token may include a unique device identification (ID). The device ID includes a series of bytes that identify the peripheral device 105 in exemplary embodiments. In addition, the device token may include a public key. In general, public key cryptography is a method for secret communication between two parties without requiring an initial exchange of secret keys. The public key may be one of a set of keys that includes the public key and a private key. The private key may be retained by the peripheral device 105. The public key and the private key may be used by the cryptography module to encrypt and decrypt information stored by the memory 205 and transferred between the peripheral device 105 and the server.

The server secure channel engine, or certain modules thereof, may be included in the memory and/or storage of the server. The server secure channel engine includes a server cryptography module, a shared secret module, a signature module, and a server storage module.

Execution of the server cryptography module allows the processor of the server to encrypt and decrypt information stored by the memory and storage of the server and transferred between the peripheral device 105 and the server. Much like device cryptography module, the server cryptography module implements one or more of a variety of cryptographic technologies in accordance with exemplary embodiments. The server cryptography module may also be executable to concatenate information transferred between the peripheral device 105 and the server.

Execution of the shared secret generation module allows the processor of the server to generate a shared secret. This shared secret may be distributed to the peripheral device 105. The shared secret includes an AES key concatenated with a MAC in exemplary embodiments. Those skilled in the art will be familiar with AES keys.

Execution of the signature module allows the processor of the server to digitally sign certain information transferred to the portable storage device 105. In exemplary embodiments, the signature module may utilize an RSA signature. RSA is an algorithm for public key cryptography that is suitable for signing as well as encryption.

The server storage module may be configured to manage information associated with a secure channel formed between the peripheral device 105 and the server. This information may be stored by the memory or storage of the server, and is accessed through execution of the server storage module. In exemplary embodiments, this information includes information associated with the peripheral device 105. For example, this information may include the device ID of the peripheral device 105.

The secure channel (or secure communication path), including the device secure channel engine and the server secure channel engine, are described more fully in "Establishing a Secure Channel Between a Server and a Portable Storage Device," which was referenced above.

It is contemplated that the peripheral device 105 can include any device that is capable of storing digital information. In one embodiment according to aspects of the present invention, the peripheral device 105 can be a removable or unpluggable data storage devices (e.g., a USB drive). The peripheral device 105 can be portable in one embodiment, but it is not limited to being a portable device. For illustrative purposes, the peripheral device 105 is described herein in the context of USB flash drives. The peripheral device 105 is discussed in further detail in connection with FIG. 2.

The host computer 110 includes any computing device that can interface with the peripheral device 105. Examples of the host computer 110 include a personal computer (PC), a personal digital assistant (PDA), a Smartphone, and other various devices. The host computer 110 includes one or more communications interfaces (not depicted) to facilitate communicative coupling with the peripheral device 105. Additionally, the host computer 110 can include a processor, memory such as random access memory (RAM), and storage such as read-only memory (ROM) (which are not depicted). Those skilled in the art will be familiar with the components and functionality of computing devices such as the host computer 110.

The host computer 110 can include a control panel (not depicted). According to exemplary embodiments, the control panel can be effectuated by instructions that are executed by the processor of the host computer 110. The control panel can also allow a user to manage digital information stored within the peripheral device 105.

These instructions can be stored within the peripheral device 105 and retrieved by the host computer 110 for execution. In one embodiment, these instructions can be stored as software in a control panel module in the peripheral device 105. However, it is contemplated that the instructions can be stored as software, firmware, hardware, as a combination, or in various other ways. It is also envisioned that the instructions associated with the control panel can be stored by the host computer 110, or stored remotely and accessed by the host computer 110 via a network.

Figure 2:
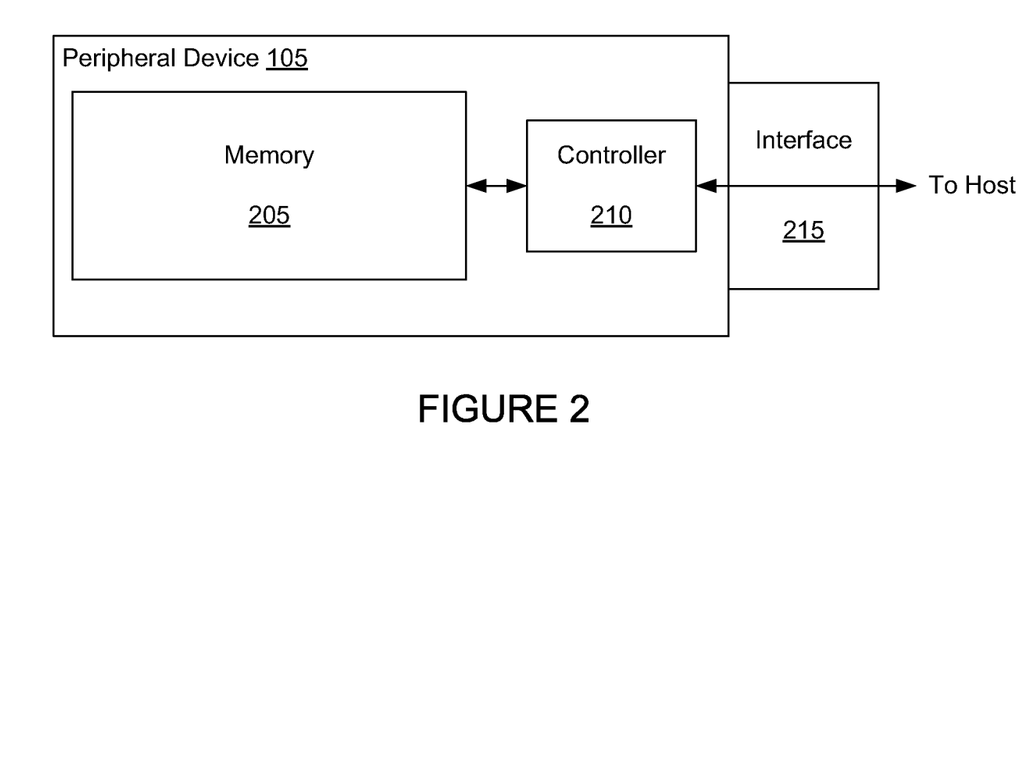
FIG. 2 is a block diagram of an exemplary peripheral device employed in the environment of FIG. 1.

FIG. 2 is a block diagram of the exemplary peripheral device 105 employed in the environment 100 of FIG. 1. The peripheral device 105 can be any device that is that is used to store digital information, and in one embodiment the peripheral device 105 is portable. In one embodiment, the peripheral device 105 depicted in FIG. 2 includes a memory 205, a controller 210, and an interface 215, which is a USB interface in one embodiment.

The memory 205 can include a computer-readable storage medium. While common forms of computer-readable storage media include, for example, a floppy disk, a flexible disk, a hard disk, magnetic tape, any other magnetic medium, a CD-ROM disc, digital video disc (DVD), and any other optical medium, the memory 205 is described in the context of non-volatile memory that can be electrically erased and rewritten. Examples of such non-volatile memory include NAND flash and NOR flash. Additionally, the memory 205 can comprise other existing memory technologies. The memory 205 can also comprise various other memory technologies as they become available in the future.

The controller 210 can be a processor or microcontroller with an amount of on-chip ROM and/or RAM. The controller 210 is communicatively coupled with the memory 205 and the interface 215. Additionally, the controller 210 can include software and/or firmware that can execute various modules, such as modules described herein. As such, the controller 210 functions as an intermediary between the host computer 110 and the memory 205. For example, the controller 210, or various modules executed thereby, can receive write commands from the host computer 110 and determine how data associated with those write commands is to be managed with respect to the memory 205.

As mentioned, the peripheral device 105 can be communicatively coupled with the host computer 110 in either a wireless or wired manner. The interface 215 facilitates this coupling by allowing information to be transferred between the peripheral device 105 and the host computer 110. In exemplary embodiments, the interface 215 includes a USB plug that is insertable into a mating USB port of the host computer 110. Alternatively, the interface 215 can include other standards for communicative coupling such as FireWire, Ethernet, Wireless USB, ESATA, Bluetooth, or other standards. Furthermore, the interface 215 can comprise other interface technologies as they become available.

Figure 3:
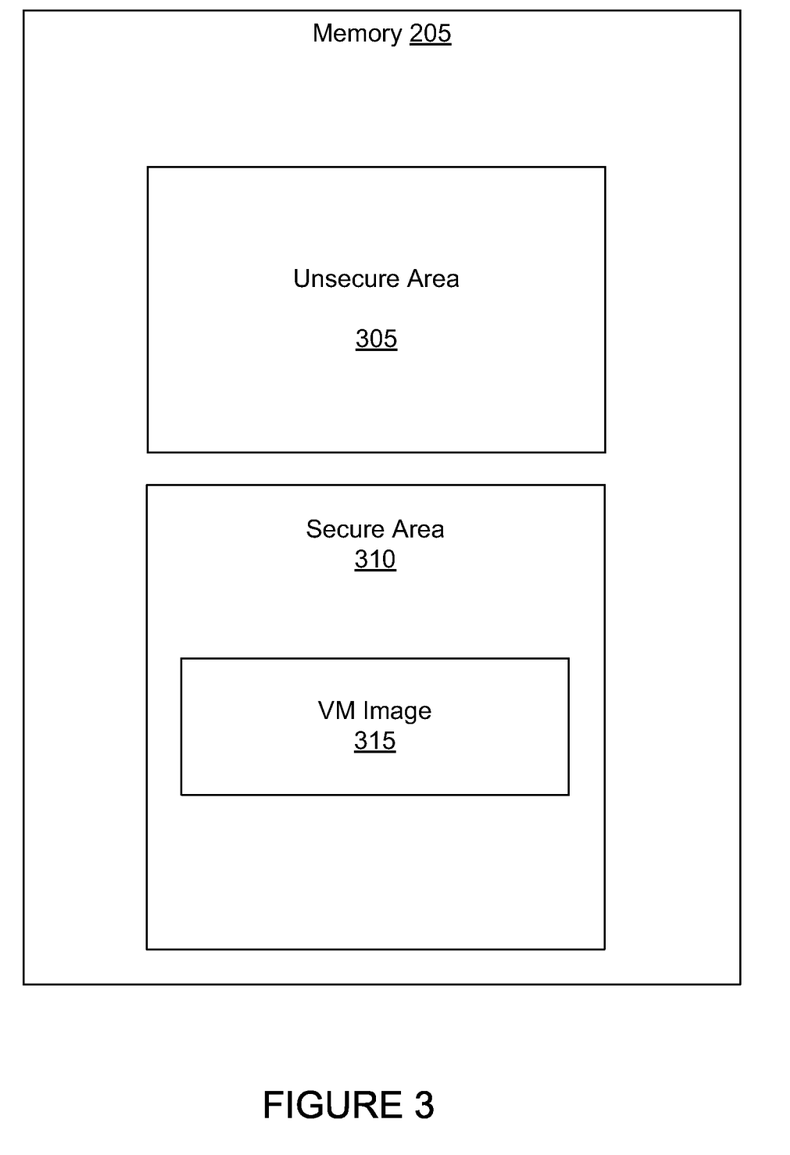
FIG. 3 is a block diagram of an exemplary memory included in the peripheral device of FIG. 2.

In keeping with embodiments according the present invention, FIG. 3 is a block diagram of the exemplary memory 205 included in the peripheral device 105 of FIG. 2. The memory 205 includes an unsecure area 305 such as a CD volume or CD partition, for example. The memory 205 also includes a secure area 310 such as a secure volume or secure partition, for example. In one embodiment, the secure area 310 is encrypted.

As used herein, the term "unsecure area" can mean an area of memory of the peripheral device 105 that is completely unsecure. Alternatively, the term "unsecure area" refer to an area of memory of the peripheral device 105 that includes some level of protection to prevent a user from updating the area. In one embodiment, "unsecure area" may be an area of memory emulating a CD-ROM.

As used herein, the term "secure area" can refer to an area of memory of the peripheral device 105 that is encrypted in order to keep unauthorized users from accessing the area. In one embodiment, the term "secure area" can refer to a secure volume on the peripheral device 105. In one embodiment, the term "secure area" can refer to an area of memory that is unwritable to one or more users.

A VM image 315, which is considered to be a guest OS, is stored in the secure area 310. In an alternate embodiment, the virtual machine image 315 is stored in the unsecure area 305.

Figure 4:
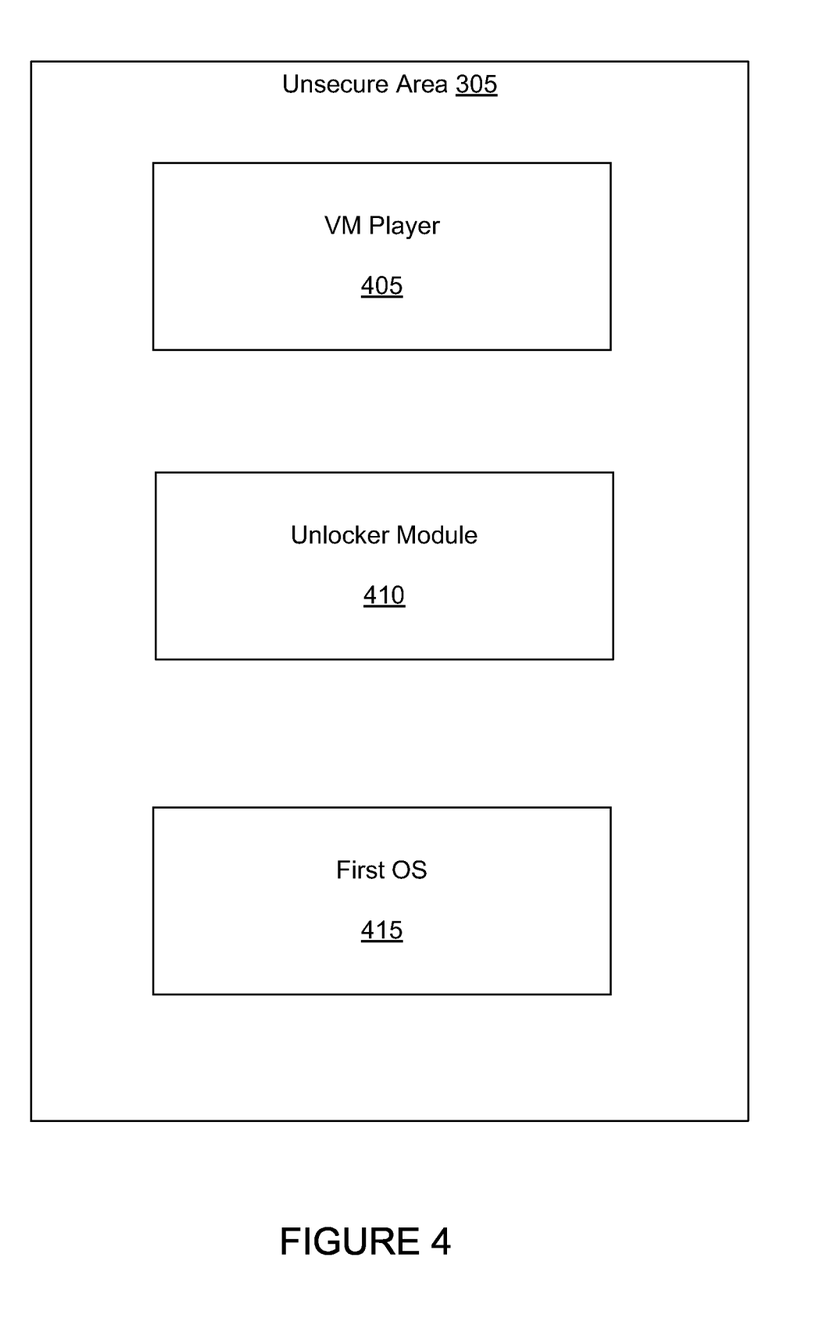
FIG. 4 is a block diagram of an exemplary unsecure area included in the peripheral device of FIG. 2.

FIG. 4 is a block diagram of the exemplary unsecure area 305 included in the peripheral device of FIG. 2. The unsecure area 305 includes a VM player 405, an unlocker module 410, and a first OS 415 (which could be considered a host OS and could be a small OS in one embodiment). Modules mentioned herein, such as those included in the unsecure area 305 and secure area 310, can be stored as software, firmware, hardware, as a combination, or in various other ways. It is contemplated that various modules can be removed or included in other suitable locations besides those locations specifically disclosed herein. In various embodiments, additional modules can be included in the exemplary system described herein. It is envisioned that in various embodiments the first OS 415 is not required.

In one embodiment, the CD-ROM image (mentioned herein) is encrypted, except for a master boot record and a pre-boot OS which requests a password from the user, and if the password is correct, then decrypts the first OS and continues the boot process.

In keeping with embodiments according to the present invention, the VM player 405 is configured to run the VM image 315, which is considered to be a guest OS as mentioned herein. In one embodiment, the VM image 315 is specifically node-locked to the VM player 405. The unlocker module 410 is configured to unlock the secure area 310 of the memory 205 if a user enters a correct password. The unlocker module 410 is further configured to launch the VM player 405 on the first OS 415. In other embodiments, the first OS 415 launches the VM player 405. In one embodiment, the first OS 415 runs a program that calls the unlocker module 410. The program might check to see if the secure area 310 is opened first, and if it is, indicate that no unlocking is currently needed. In another embodiment, a launching module is used to launch the VM player 405.

Figure 5:
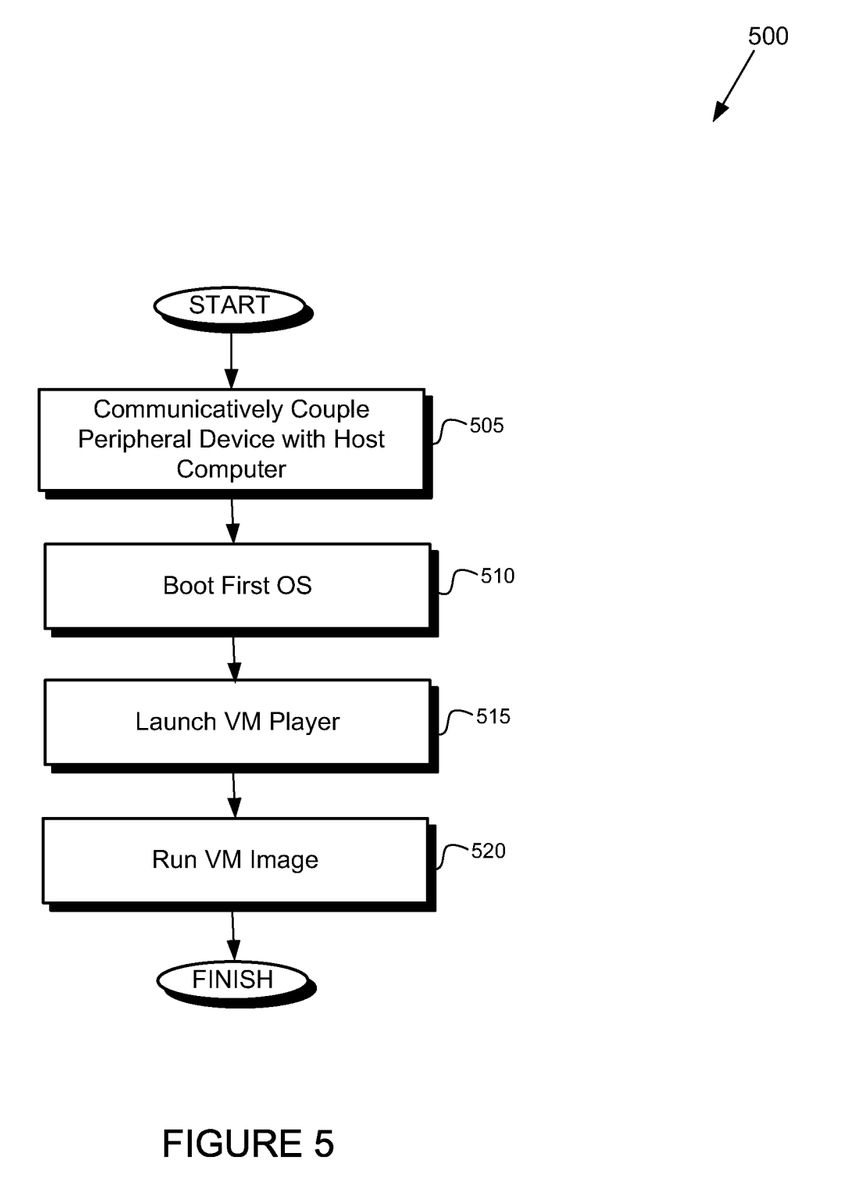
FIG. 5 is a flowchart of an exemplary method for booting a virtual machine on a first, or host, operating system.
Figure 6:
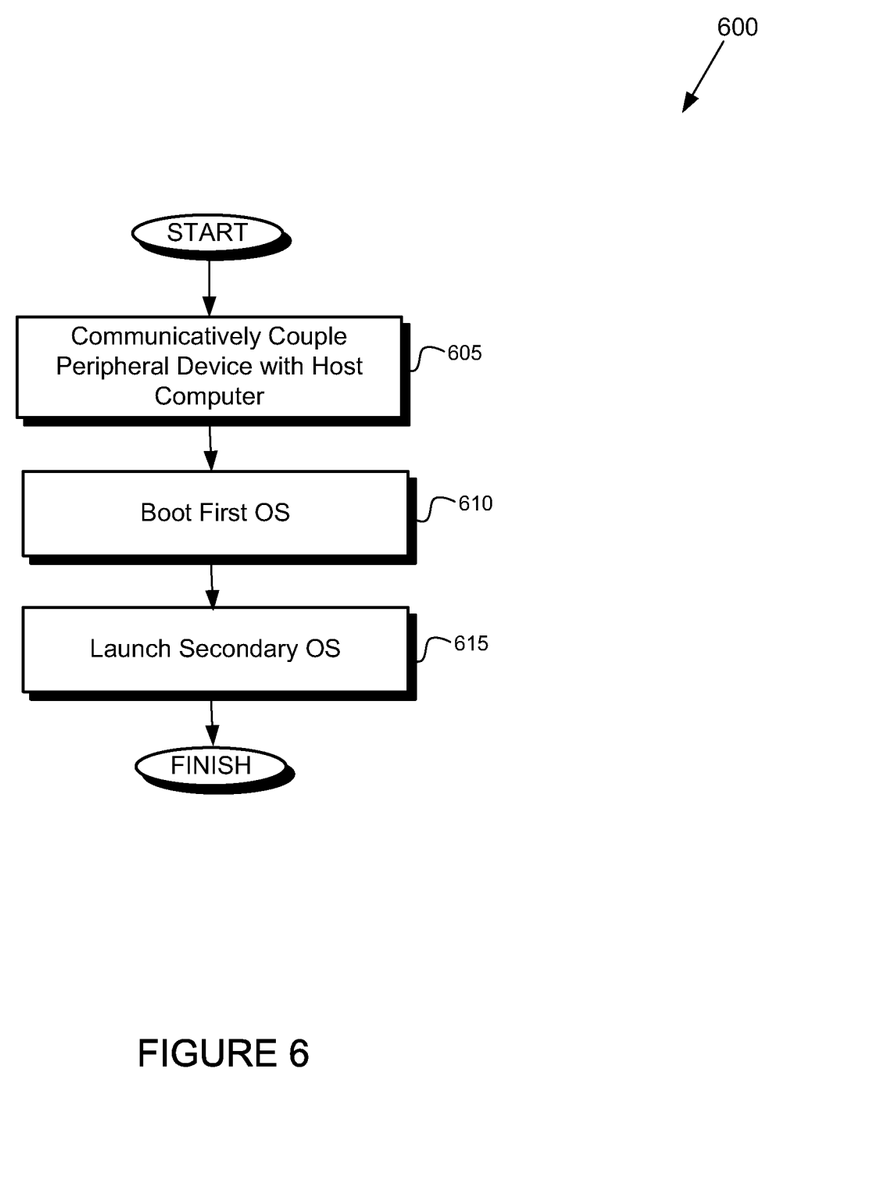
FIG. 6 is a flowchart of an exemplary method for booting a secondary operating system.

FIGS. 5 and 6 relate to embodiments for booting an OS from a peripheral device on a host computer. FIG. 5 is a flowchart of an exemplary method for booting a virtual machine on a first OS (or host OS). In one embodiment, at step 505, the peripheral device 105 is communicatively coupled with the host computer 110, thus forming a secure channel.

At step 510, the first OS is booted from the memory 205 of the peripheral device 105. In one embodiment, the first OS is booted from the unsecure area 305 (such as a CD partition) of the memory 205.

Next, in one embodiment, the unlocker module 410 in the unsecure area 305 can unlock the secure area 310 of the peripheral device 105. In another embodiment, the unlocking can be done externally. In one embodiment, the first OS 415 communicates over a network to a third-party server to request permission for the peripheral device 105 to unlock the secure area and run the second OS.

At step 515, the VM player 405 is launched on the first OS. The VM player 405 can be launched from the secure area 310. Alternatively, the VM player 405 can be launched from the unsecure area 305.

At step 520, the VM player 405 runs the VM image 315 that is stored in the memory 205 of the peripheral device 105. The VM image 315 is run on the host computer 110. The VM image 315 is considered to be the guest OS, as mentioned herein. As mentioned herein, the VM image 315 can be stored in either the unsecure area 305 or the secure area 310.

In keeping with aspects of the invention, in one embodiment, the memory 205 can include a control panel module. In alternate embodiments, the control panel module can be stored in a private area on the peripheral device 105 that is not accessible by a user. The control panel module can be software that includes instructions in the form of, for example, software for running a control panel on the host computer 110. As mentioned herein, control panel modules are not limited to being software.

FIG. 6 is a flowchart of an exemplary method for booting a secondary OS. In one embodiment, no VM player 405 or VM Image 315 are implemented. In one embodiment, at step 605, the peripheral device 105 is communicatively coupled with the host computer 110, thus forming a secure channel.

At step 610, a first OS (or host OS) is booted from the memory 205 of the peripheral device 105. In one embodiment, the first OS is booted from the unsecure area 305 (such as a CD partition) of the memory 205. However, it is contemplated that the first OS could be stored in the secure area 310.

Next, in one embodiment, the unlocker module 410 in the unsecure area 305 unlocks the secure area 310 of the peripheral device 105 if a user enters a correct password.

At step 615, a secondary OS that has been stored in the secure area 310, is launched on the first OS. Alternatively, the secondary OS has been stored in the unsecure area 305. The secondary OS can be launched from the secure area 310. Alternatively, the secondary OS can be launched from the unsecure area 305. The first OS is no longer running at this point.

It is contemplated that the secondary OS can include various OSes (e.g., Linux, Windows, Mac OS, etc.). However, Windows is not portable and has seven different hardware abstraction layers (HALs). In this case, a HAL determiner module is included in either the unsecure area 305 or the secure area 310. The HAL determiner module determines which HAL should be loaded depending on the type of BIOS that resides on the host computer 110.

In one embodiment, the first OS and the unlocker module can be policy-controlled. The number of password attempts allowed for unlocking the secure area can be controlled by policy on the host. The behavior of whether a VM is actually launched or not can be controlled. The behavior of whether the guest OS is launched upon unlocking can be controlled. Various other policies can be set as well.

In one embodiment, it is contemplated that a user can boot from an OS (e.g. Linux), and if the secure area 310 is unlocked the system may be able to extend the OS to take advantage of the storage in the secure area 310 without booting a secondary OS. An advantage of this embodiment is that the user is still booting off of the secure peripheral storage device.

Thus, a system and method have been disclosed for booting an OS from a secure peripheral device on a host computer.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for booting an operating system from a secure peripheral device on a host computer, the method comprising:

communicatively coupling the secure peripheral device with the host computer, the secure peripheral device comprising a controller and memory maintaining a first operating system, a virtual machine player instance, an unlocker module, and in a secure area a secondary operating system image;

executing said unlocker module by said controller, said host computer being able to read said secondary operating system image only after executing the unlocker module by said controller to unlock the secure area;

booting said first operating system from the memory of the secure peripheral device; and after executing said unlocker module and unlocking said secure area, launching said secondary operating system image on the first operating system, wherein the virtual machine player instance is launched on the first operating system to run a virtual machine image on the host computer;

wherein the first operating system is no longer running after launching the secondary operating system image; and wherein the first operating system communicates over a network to a third-party server to request permission for the secure peripheral device to unlock the secure area of the secure peripheral device memory and run the secondary operating system image.

2. The method of claim 1, wherein the secure peripheral device memory comprises non-volatile memory.

3. The method of claim 1, said virtual machine image being only capable of being executed by said virtual machine player instance.

4. The method of claim 1, wherein launching the secondary operating system image comprises launching an emulation of a virtual machine.

5. The method of claim 1, further comprising receiving a password entered by a user, using said password by said unlocker module, and, if the password is correct unlocking the secure area of the memory of the secure peripheral device before launching the secondary operating system image.

6. The method of claim 1, wherein booting the first operating system from the memory of the secure peripheral device comprises booting the first operating system from an area of the memory of the secure peripheral device, the area of memory being unwritable to a user.

7. The method of claim 1, further comprising forming a secure channel between the secure peripheral device and a server, said secure channel having the effect that said host computer cannot read messages exchanged between said secure peripheral device and said server.

8. The method of claim 1, wherein the first operating system is maintained in an unsecure area of the memory of the secure peripheral device.

9. The method of claim 1, wherein the first operating system is a host operating system.

10. The method of claim 9, wherein the host operating system is stored on the secure peripheral device and runs on the host computer.

11. The method of claim 1, wherein the virtual machine image is stored in the memory of the secure peripheral device, the virtual machine image comprising the secondary operating system image.

12. The method of claim 11, wherein the virtual machine image is specifically node-locked to the virtual machine player instance, said virtual machine image being only capable of being executed by said virtual machine player instance.

13. The method of claim 1, wherein the virtual machine player instance is launched from the secure area of the memory of the secure peripheral device.

14. The method of claim 1, wherein the virtual machine player instance is launched from an unsecure area of the memory of the secure peripheral device.

15. The method of claim 1, wherein the virtual machine player instance has associated therewith the virtual machine image, wherein the virtual machine image runs from the secure area of the memory of the secure peripheral device.

16. A method as in claim 1, including steps of exchanging messages between said secondary operating system image and a server, in such manner that said host computer is unable to read said messages.

17. A method as in claim 1, wherein said controller is capable of encryption and decryption of information exchanged with a server.

18. A method for booting an operating system from a secure peripheral device on a host computer, the method comprising:

communicatively coupling the secure peripheral device with the host computer, the secure peripheral device comprising a controller and memory maintaining a first operating system, a virtual machine player instance, an unlocker module, and in a secure area a secondary operating system image;

executing said unlocker module by said controller, said host computer being able to read said secondary operating system image only after executing the unlocker module by said controller to unlock the secure area;

booting said first operating system from the memory of the secure peripheral device; and after executing said unlocker module and unlocking said secure area, launching said secondary operating system image on the first operating system, wherein the virtual machine player instance is launched on the first operating system to run a virtual machine image on the host computer;

wherein the first operating system is no longer running after launching the secondary operating system image;

wherein booting the first operating system from the memory of the secure peripheral device comprises booting the first operating system from an area of the memory of the secure peripheral device, the area of memory emulating a CD-ROM; and wherein a CD-ROM image presented by the secure peripheral device is encrypted, except for a master boot record and a pre-boot operating system which requests a password from the user, and if the password is correct, then decrypts the first operating system and continues a boot process for said booting of said first operating system.

19. The method of claim 18, wherein a CD-ROM image is presented to the host computer by the secure peripheral device, and the CD-ROM image is configured for the first operating system to be bootable by the host computer.

20. The method of claim 18, wherein a CD-ROM image is presented to the host computer by the secure peripheral device, and the CD-ROM image contains a master boot record.

21. A system for booting an operating system from a secure peripheral device on a host computer, the system comprising:

a secure peripheral device comprising a controller and memory maintaining a first operating system executable by the processor to launch a computer program, a virtual machine player instance, an unlocker module executable by the controller, and in a secure area a secondary operating system image; and a host computer configured to run the first operating system by booting said first operating system from the memory of the secure peripheral device, the host computer communicatively coupled with the secure peripheral device, said host computer being able to read said secondary operating system image only after executing said unlocker module by said controller to unlock the secure area; and the secondary operating system image executable by the host computer by launching said secondary operating system image on the first operating system after executing said unlocker module and unlocking said secure area, wherein the virtual machine player instance is launched on the first operating system to run a virtual machine image on the host computer;

wherein the first operating system is no longer running after launching the secondary operating system image; and wherein the first operating system communicates over a network to a third-party server to request permission for the secure peripheral device to unlock the secure area of the secure peripheral device memory and run the secondary operating system image.

22. The system of claim 21, wherein the secondary operating system image comprises the virtual machine image.

23. The system of claim 21, said virtual machine image being only capable of being executed by said virtual machine player instance.

24. The system of claim 21, wherein the computer program comprises the unlocker module.

25. The system of claim 24, wherein the unlocker module is configured to unlock the secure area of the peripheral device memory and launch the secondary operating system image.

26. The system of claim 21, wherein the first operating system is maintained in an area of the memory of the secure peripheral device that is unwritable to a user.

27. The system of claim 21, wherein:
the virtual machine image comprises the secondary operating system image; and
the computer program is configured to launch the virtual machine player instance on the first operating system.

28. The system of claim 27, wherein the memory of the secure peripheral device comprises an unsecure area.

29. The system of claim 27, wherein the computer program is configured to launch the virtual machine player instance from an unsecure area of the memory of the secure peripheral device.

30. The system of claim 27, wherein the computer program is configured to launch the virtual machine player instance from the secure area of the memory of the secure peripheral device.

31. The system of claim 27, wherein an unsecure area of the memory of the secure peripheral device maintains the unlocking module configured to unlock the secure area of the memory of the secure peripheral device.

32. The system of claim 27, wherein the secondary operating system image is configured to run applications that are native to the first operating system.

33. The system of claim 27, wherein the secondary operating system image is configured to run applications that are not native to the first operating system.

34. The system of claim 27, wherein the virtual machine image is specifically node-locked to the virtual machine player instance, said virtual machine image being only capable of being executed by said virtual machine player instance.

35. A non-transitory computer readable storage medium having program code embodied thereon, the program code executable by a processor to perform a method for booting an operating system from a secure peripheral device on a host computer, the method comprising:
communicatively coupling the secure peripheral device with the host computer, the secure peripheral device comprising a controller and memory maintaining a first operating system, a virtual machine player instance, and an unlocker module, and in a secure area a secondary operating system image;
executing said unlocker module by said controller, said host computer being able to read said secondary operating system image only after executing the unlocker module by said controller to unlock the secure area;
booting said first operating system from the memory of the secure peripheral device;
after executing said unlocker module and unlocking said secure area, launching said secondary operating system image on the first operating system, wherein said virtual machine player instance is launched on the first operating system to run a virtual machine image on the host computer; and
running, via said virtual machine player instance the virtual machine image on the host computer, said virtual machine image comprising the secondary operating system image;
wherein the first operating system is no longer running after launching the secondary operating system image; and
wherein the first operating system communicates over a network to a third-party server to request permission for the secure peripheral device to unlock the secure area of the secure peripheral device memory and run the secondary operating system image.

36. The medium of claim 35, the method further comprising forming a secure channel between the secure peripheral device and a server, said secure channel having the effect that said host computer cannot read messages exchanged between said secure peripheral device and said server.

37. The medium of claim 36, the method further exchanging messages between said secondary operating system image and said server, said host computer being unable to read said messages.

38. The medium of claim 35, the method further comprising node locking said virtual machine image to said virtual machine player instance, the virtual machine image being only capable of being executed by said virtual machine player instance.

* * * * *

UNITED STATES PATENT AND TRADEMARK OFFICE
CERTIFICATE OF CORRECTION

PATENT NO.        : 8,745,365 B2                                    Page 1 of 1
APPLICATION NO.   : 12/537194
DATED             : June 3, 2014
INVENTOR(S)       : David Jevans et al.

It is certified that error appears in the above-identified patent and that said Letters Patent is hereby corrected as shown below:

At Inventors (75), on Title page,
      "Eric R. Smith, Halifax CA (US)"

should read:
      -- Eric R. Smith, Halifax, Nova Scotia (CA) --

Signed and Sealed this
Ninth Day of September, 2014

Michelle K. Lee
*Deputy Director of the United States Patent and Trademark Office*